May 15, 1951  H. REGAN  2,553,005

PROJECTING KALEIDOGRAPH

Filed Nov. 12, 1949  4 Sheets-Sheet 1

INVENTOR.
Henry Regan
BY Edwin Lerrohn +
Harry Cole
Attorneys.

May 15, 1951     H. REGAN     2,553,005
PROJECTING KALEIDOGRAPH

Filed Nov. 12, 1949     4 Sheets-Sheet 2

INVENTOR.
Henry Regan
BY Edwin Levisohn &
Harry Cohn
Attorneys.

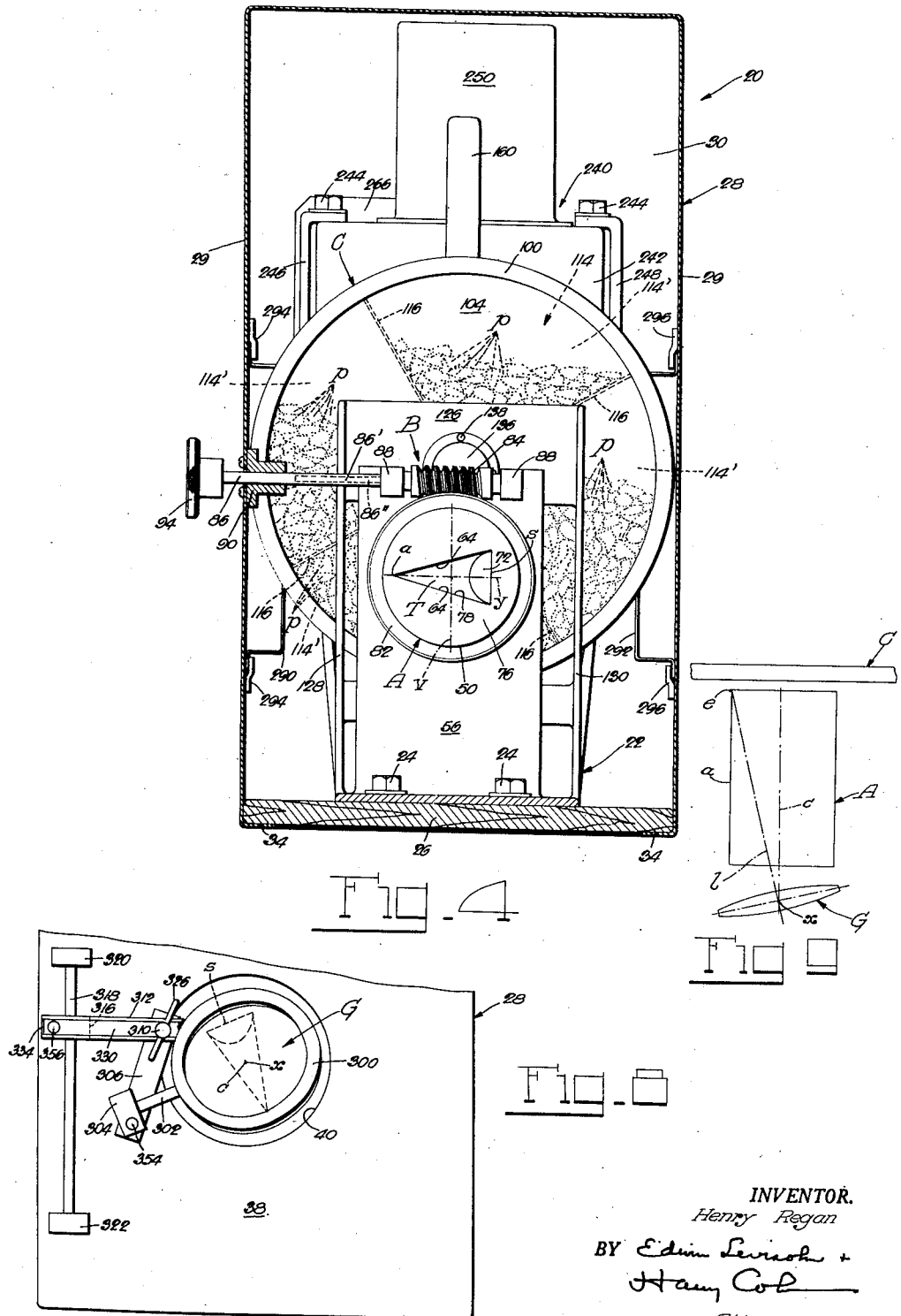

May 15, 1951 H. REGAN 2,553,005
PROJECTING KALEIDOGRAPH
Filed Nov. 12, 1949 4 Sheets-Sheet 4

INVENTOR.
Henry Regan
BY Edwin Levisohn &
Harry Cohn
Attorneys.

Patented May 15, 1951

2,553,005

UNITED STATES PATENT OFFICE 2,553,005

PROJECTING KALEIDOGRAPH

Henry Regan, New York, N. Y.

Application November 12, 1949, Serial No. 126,754

9 Claims. (Cl. 88—24)

This invention relates to image projectors in general, and to kaleidographs in particular.

It is an object of the present invention to provide a kaleidograph which projects ever-changing kaleidoscopic color and/or form patterns on a screen or the like, for the amusement of spectators, or for suggesting or inspiring decorative designs and patterns for commercial use.

It is another object of the present invention to make provisions in a kaleidograph for projecting on a screen or the like a kaleidoscopic design or pattern which, besides its ever-changing colors and/or form, converges toward, or diverges from, the center of the projection in a continuous motion.

It is another object of the present invention to make provisions in a kaleidograph for projecting on a screen or the like a kaleidoscopic design or pattern which, besides its ever-changing colors and/or form and its converging or diverging motion, may have a rotary motion in either direction about the center of the projection.

It is another object of the present invention to make provisions in a kaleidograph for attaining during a given time period wider changes in the projected kaleidoscopic color and/or form patterns than was heretofore possible.

It is another object of the present invention to make provisions in a kaleidograph for readily adjusting the focus of the projection lens thereof so that the projected kaleidoscopic pattern is uniformly clear concentrically about the center of the pattern.

It is another object of the present invention to make provisions in a kaleidograph for interrupting the constant changes in the projected kaleidoscopic color and/or form patterns and holding the presently projected pattern stationary on the screen for studying or copying purposes.

It is another object of the present invention to make provisions in a kaleidograph for the ready replacement therein of the pattern-creating pieces, such as bits of colored glass, with pieces of different shapes or colors or light-impervious pieces, for instance, so as readily to adapt the kaleidograph for the projection on a screen of kaleidoscopic designs or patterns of fundamentally different color and/or form combinations which are unattainable with the same pieces.

It is another object of the present invention to provide a kaleidograph which, during continuous operation thereof, permits periodic interjection by another projector of advertising or other matter on the same screen in alternation with the projected kaleidoscopic patterns, thereby to enhance the use of the kaleidograph for commercial purposes.

It is another object of the present invention to provide in a kaleidograph for most effective protection of all parts thereof from the considerable heat that emanates from the light source therein, so as to permit operation of the kaleidograph over an unusually long period of time without becoming overheated.

It is another object of the present invention to provide a kaleidograph which is of such simple construction that it lends itself to efficient mass production, and may readily be made in the form of an inexpensive toy for children or in a more elaborate form for commercial purposes.

The above and other objects, features and advantages of the present invention will be more fully understood from the following description considered in connection with the accompanying illustrative drawings.

Figure 1:
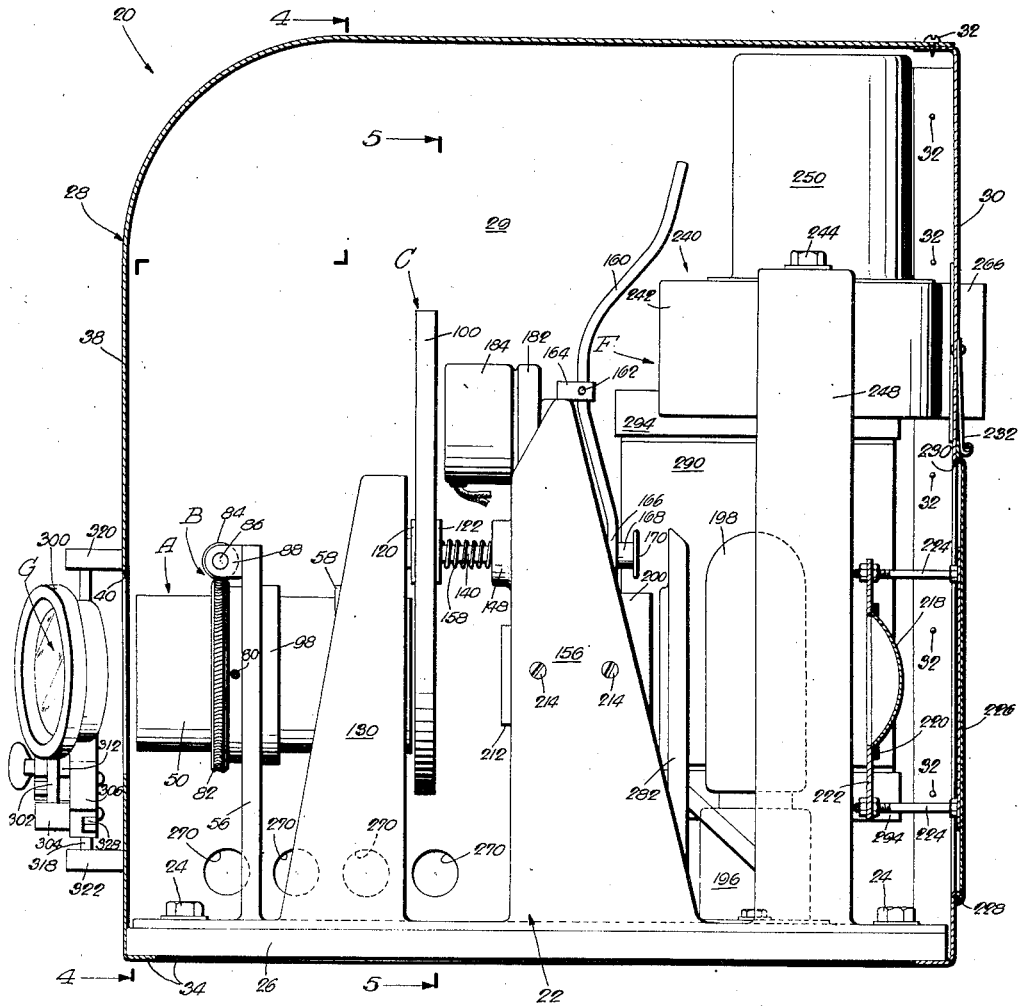
Fig. 1 is a side elevation, partly in section, of a kaleidograph embodying the present invention.
Figure 2:
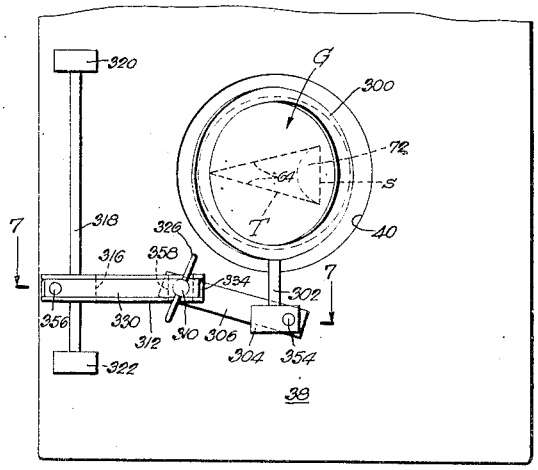
Fig. 2 is a fragmentary front elevation of the kaleidograph.
Figure 3:
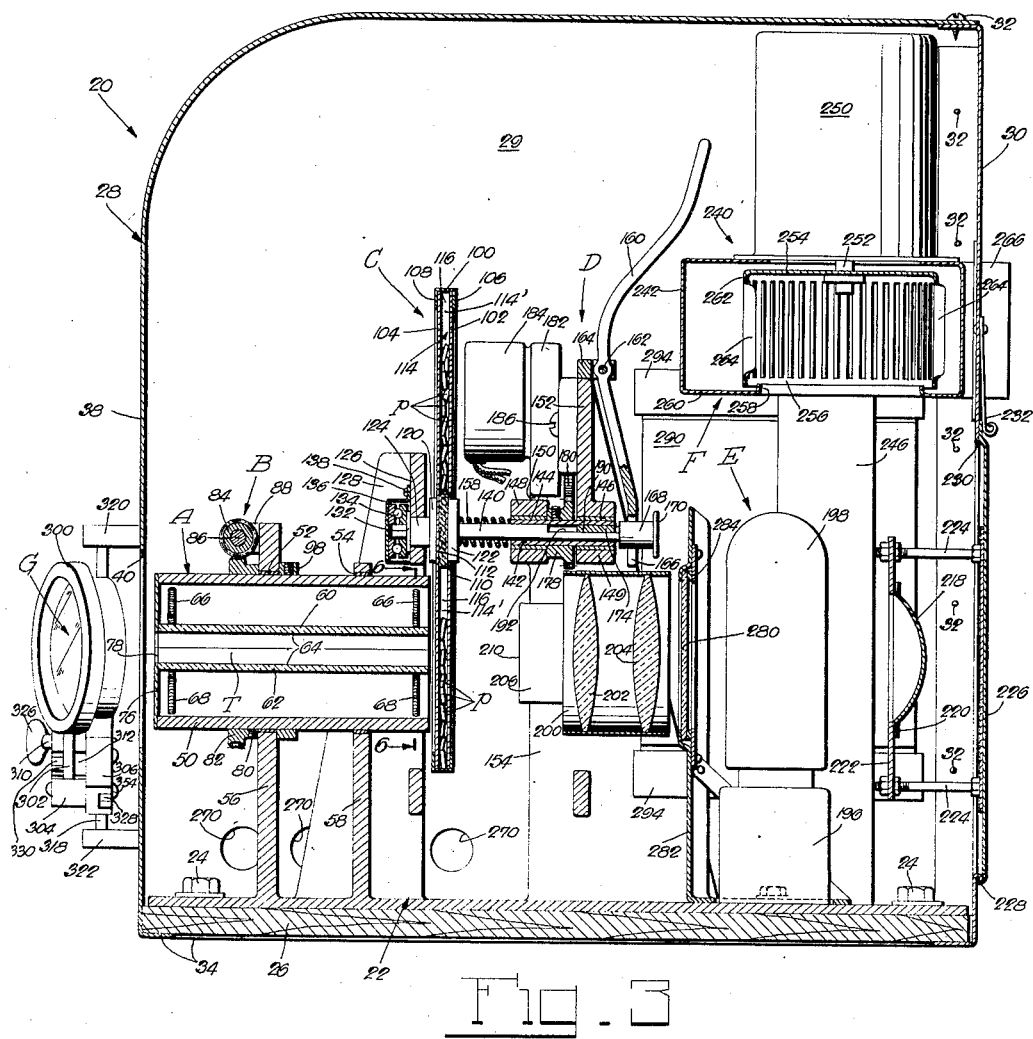
Fig. 3 is a longitudinal section through the kaleidograph.
Figure 7:
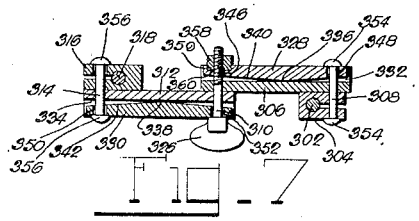
Figure 5:
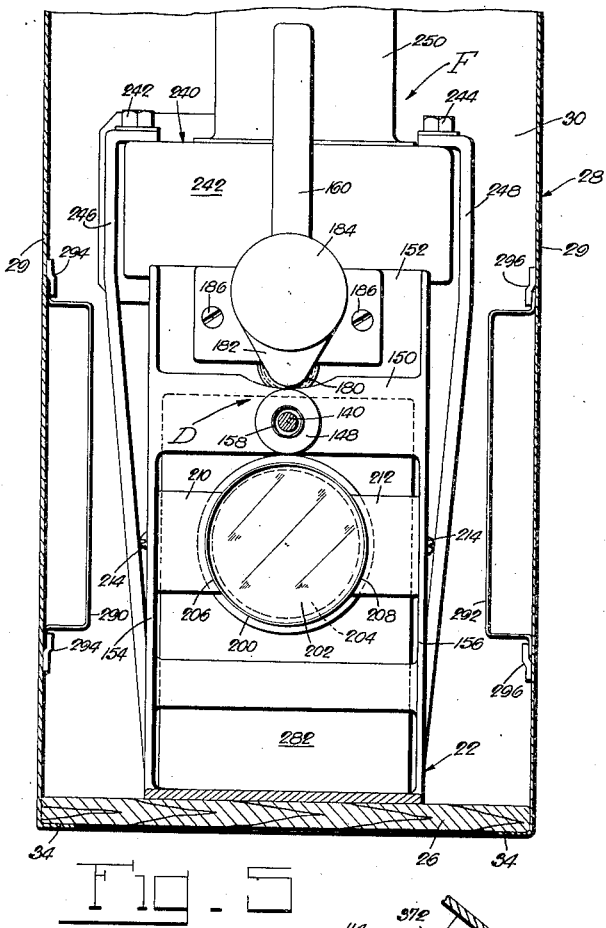
Figure 6:
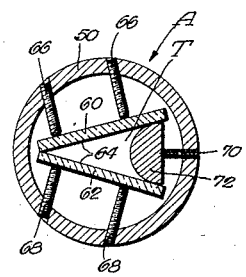
Figure 10:
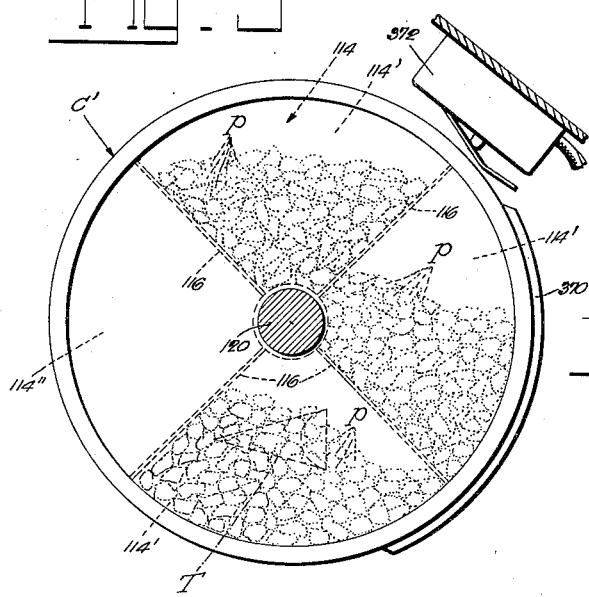

Figs. 4 and 5 are sections taken substantially on the lines 4—4 and 5—5, respectively, of Fig. 1;

Fig. 6 is a section taken on the line 6—6 of Fig. 3;

Fig. 7 is a section taken substantially on the line 7—7 of Fig. 2;

Fig. 8 is a view similar to Fig. 2, showing certain parts of the kaleidograph in a different operating position;

Fig. 9 illustrates diagrammatically the correct adjustment of the projection lens of the kaleidograph; and Fig. 10 shows a modified arrangement of a certain operating part of the kaleidograph.

Referring to the drawings, and more particularly to Figs. 1 to 4 thereof, the reference numeral 20 designates a kaleidograph which comprises a main frame 22 suitably mounted at 24 on a base 26. The base 26 and frame 22 are normally located in a casing 28 which is normally closed at its open bottom by the base 26. The casing 28 is also normally closed at its open rear by a cover 30 which is removably mounted in the casing 28 in any suitable manner, as by means of screws 32, for instance. The casing 28 is provided with inwardly turned bottom flanges 34 on which the base 26 may, if desired, be removably secured by any suitable means (not shown). The casing 28 is in its front wall 38 provided with an aperture 40. By mounting the base 26 and frame 22 in the housing 20 as described, they are readily removable from the latter for the inspection, adjustment, servicing or repair of the operating parts and devices of the kaleidograph which are carried by the frame 22. These operating parts and devices are a mirror tube A (Figs. 1, 3, 4 and 6), provisions B for turning the mirror tube (Figs. 1, 3 and 4), a drum C for holding pattern-creating pieces (Figs. 1, 3 and 4), an operating device D for the drum C (Figs. 3 and 5), illumination means E (Fig. 3), and heat-dissipating provisions F (Figs. 1, 3 and 5). Another operating part of the kaleidograph is provided on the casing 28 in the form of a projection lens G.

Mirror tube A

Referring to Figs. 1, 3, 4 and 6, the mirror tube A provides a tube 50 which is journalled in bushings 52 and 54 in spaced upright walls 56 and 58, respectively, of the frame 22. Provided in the tube 50 are mirrors 60 and 62, the reflector surfaces 64 of which are in opposed relation to each other (Fig. 6). The mirrors 60 and 62 are, in conformity with the kaleidoscope principle, arranged so as to form an angle with each other, and are mounted in the tube 50 through intermediation of set screws 66, 68, 70 and a spacer 72 (Figs. 3 and 6). More particularly, the mirrors 60 and 62 are held with their rear surfaces in engagement with the set screws 66 and 68, respectively, by the spacer element 72 which is in turn, held between the spread sides of the mirrors by the set screws 70. The spacer 72, which may extend throughout the longitudinal extent of the tube 50 and mirrors 60 and 62 therein, is preferably of semicircular cross-section so as to act as a self-centering wedge between the mirrors 60 and 62. By the provision of the spacer 72 and set screws 66, 68 and 70, the mirrors 60 and 62 may also be readily adjusted to define different angles between them. As best shown in Fig. 3, the tube 50 is open at the rear, and is partly closed at the front by a light shield 76 which is apertured at 78 to frame the triangle T formed by the reflector surfaces 64 of the mirrors 60 and 62, respectively, and the spacer 72 (see also Fig. 4).

Provisions B

Referring now to Figs. 1, 3 and 4, there is suitably mounted on the tube 50, as by a set screw 80, a worm gear 82 which is in permanent mesh with a worm 84 on a shaft 86, journalled in suitable bearing lugs 88 on the upright wall 56 of the frame 22. The worm shaft 86 projects, preferably through a bushing 90 on one of the side walls 20 of the casing 28, to the outside of the latter and carries a knob 94 with which to turn the worm 84 and thereby effect angular adjustment of the mirror tube A for a purpose hereinafter described. As best shown in Fig. 3, the worm gear 82 is held in engagement with the adjacent wall 56 of the frame 22 by an adjustable collar 96 on the tube 50, thereby also preventing axial movement of the latter in the frame 22.

Drum C

Referring to Figs. 3, 4 and 10, there is shown the drum C which, in the present instance, is cylindrical and comprises a peripheral rim 100 in the form of a circularly bent channel, and opposite disks 102 and 104 which are with their peripheral margins received in the rim 100 and suitably secured, as by cementing, to the adjacent inward flanges 106 and 108, respectively, of the latter. The disk 102 is, in the present instance, made of any suitable translucent material, such as frosted glass, for instance, while the opposite disk 104 is preferably made of transparent glass or plastic. The disk 102 is centrally recessed at 110 for a purpose hereinafter described. Interposed between the disks 102 and 104 in covering relation with the aperture 110 in the disk 102 is a center disk 112 which is made of any suitable friction material, such as cork, for instance. The rim 100 and the disks 102, 104 and 112 define a ring-shaped chamber 114 which is, in the present instance, divided into a number of sub-chambers 114' by radial partitions 116 (Fig. 4). Received in each of the sub-chambers 114' of the drum is a multitude of pattern-creating pieces p which may be bits of colored glass, for instance. The pieces p are so loose in the drum C that they will, on rotation of the latter, gravitate toward the bottommost portions of the sub-chambers 114' in which they are received, and will thus be constantly in motion during rotation of the drum C.

Operating device D

Referring now to Figs. 3 and 5, the drum C is removably mounted for rotation about its axis on disks 120 and 122. The disk 120 has a shank 124 which is rotatably mounted in a transverse reenforcement rib 126 between upright walls 128 and 130 of the frame 22 (Figs. 3 and 4). The shank 124 of the disk 120 is provided with a collar 132 which bears against a thrust bearing 134 in a cage 136 that is suitably mounted at 138 on the rib 126. The disk 122 is, for the removable mounting of the drum C, retractable from the latter, and is to this end carried by a stub 140 which is axially slidable in a rotary sleeve 142. The sleeve 142 is journalled in bushings 144 and 146 in bosses 148 and 149, respectively, on transverse reenforcement ribs 150 and 152, respectively, between opposite upright walls 154 and 156 of the frame 22 (Figs. 3 and 5). The aperture 110 in the disk 102 of the drum C is of such diameter as readily to admit the disk 122 into engagement with the center disk 112 of the drum (Fig. 3). The disk 122, which is normally urged into holding engagement with the center disk 112 of the drum by a spring 158, is, for the removal of the mounted drum C, retracted from the center disk 112 of the latter by a manually rockable lever 160 which is pivotally mounted at 162 in a bracket 164 on the rib 152, and has a forked end 166 which straddles the shank 168 of a collar 170 on the stub 140. Thus, on rocking the lever 160 counter-clockwise as viewed in Fig. 3, the end fork 166 thereof will engage the collar 170 on the stub 140 and retract the disk 122 from holding engagement with the drum C against the tendency of the spring 158 to hold the disk 122 in holding engagement with the drum.

The disk 122 is not only a mounting element but is also a driving element for the drum C. To this end, the stub 140 is splined at 174 to the rotary sleeve 142 which has mounted thereon a gear 178 that is in permanent mesh with a gear 180 on the slow shaft of a reduction gearing 182, which is associated with an electric motor 184. The motor and reduction gearing unit 184, 182 is mounted at 186 on the rib 152 of the frame 22 (Figs. 3 and 5). The gear 178, being interposed between the bosses 148 and 149 on the frame 22 in the manner shown in Fig. 3, holds the rotary sleeve 142 against axial movement in the frame 22. The spline 174 is conveniently made in the form of a cross-sectionally semi-circular key which is braced or otherwise secured to the sleeve 142 and slidable with its flat surface 190 on a machined flat surface 192 on the stub 140.

Illumination means E

Referring now to Fig. 3, there is suitably mounted on the frame 22 a socket 196 for the reception of a light or projection bulb 198 which is in illuminating relation with the interior of the mirror tube A, and also with the drum C, including that part of the latter which is within the confines of the triangle T formed by the mirrors 60 and 62 and the spacer 72. Suitably mounted in a cylindrical holder 200 are lenses 202 and 204 which are adapted to concentrate the light rays emanating from the bulb 198 and project them into the mirror triangle T in the interior of the tube A. To this end, the lens holder 200 is held between the opposed arcuate faces 206 and 208 of the jaws 210 and 212, respectively, which are suitably secured, as by screws 214, to the adjacent upright walls 154 and 156, respectively, of the frame 22 (see also Fig. 5). Conveniently, the lens holder 200 is held between the jaws 210 and 212 with a forced sliding fit so as readily to be axially adjustable in the frame 22 to permit accurate focussing of the lenses 202 and 204.

Preferably provided in the rear of the light bulb 198 is a parabolic mirror 218 which is so coordinated with the filament of the bulb 198 as to reflect the rearwardly diverging light rays from the bulb 198 into forward parallel paths to the lenses 202 and 204. The parabolic mirror 218 is secured by any suitable holder 220 to the rear of an apertured mounting plate 222 which is, in turn, mounted by rods 224 on a plate-reinforced part of a door 226, hingedly mounted at 228 on the cover 30 and adapted normally to close an opening 230 in the latter. The door 226 is normally held closed by a turnable latch 232 on the cover 30. The opening 230 in the cover 30 is for the purpose of gaining ready access to the interior of the closed casing 28 for undertaking minor adjustments or repairs of the operating parts therein, and especially for the facile replacement of a burned-out bulb. For any major adjustments or repairs of the operating parts or devices of the kaleidograph, and especially for an interchange of drum C therein, the cover 30 may quickly be removed from the casing 28 and the latter withdrawn from the frame 22 and parts carried thereby for ready access to the latter. Withdrawal of the casing 28 from the frame 22 requires previous release of the base 26 from the casing 28 if the former is releasably secured to the bottom flanges 34 of the latter, as described. Withdrawal of the casing 28 from the frame 22 requires also previous retraction of the worm shaft 86 from the casing 28 (Fig. 4). To this end, the worm shaft 86 may be in the form of splined telescoping sections 86' and 86'', of which the section 86' carries the knob 94 and is retractable from the section 86'', and the latter carries the worm 84 (Fig. 4).

Provisions F

Referring to Figs. 1, 3 and 5, there is shown a fan 240 having a housing 242 which is suitably mounted at 244 on upright walls 246 and 248 of the frame 22. Suitably mounted on top of the fan housing 242 is an electric motor 250, the shaft 252 of which carries an impeller 254 which, in the present instance, is of inverted cup-shape and communicates at its open bottom 256 with the interior of the casing 28 through a draft opening 258 in the bottom wall 260 of the fan housing 242. Preferably punched from the annular wall 262 of the impeller 254 are fan blades 264 which, on rotation of the impeller, draw air from the interior of the casing 28 and expel it to the outside thereof through an outlet 266 in the fan housing 242.

As shown in Figs. 1 and 3, the side walls 29 of the casing 28 are, in the present instance, provided with a plurality of ventilation apertures 270 which, for a reason to be described presently, are located near the forward end of the frame 22 and in fairly close proximity to the base 26. On the other hand, the draft opening 258 in the fan housing 242 is, as shown in Fig. 3, located in fairly close proximity to, and above the light bulb 198, so that the fan will have a maximum draft on the air in the immediate vicinity of the hot bulb 198. Further, the light bulb 198 is situated substantially in the path of the ventilation air which is drawn by the fan 240 into the casing 28 through the apertures 270 therein, thereby accomplishing a most thorough heat exchange between the ventilation air in the casing 28 and the bulb 198 therein and preventing any substantial transmission of the heat from the bulb 198 to the operating parts and devices of the kaleidograph.

As a further precaution to prevent the heat from the bulb 198 to reach and possibly break the lenses 202 and 204, there is preferably interposed between the lens holder 200 and the bulb 198 a shield 280 of polaroid glass which has good heat-insulating properties. The polaroid shield 280 is conveniently mounted on a bracket 282 on the frame 22 through intermediation of a ring-shaped holder 284.

In order to prevent the light rays from the bulb 198 to heat the opposite side walls 29 of the casing 28 to an extent where they would feel uncomfortably hot to the operator's touch, there are preferably provided on the opposite casing walls 29 baffle plates or shields 290 and 292, respectively, which for a reason presently to be described are removably mounted in guide channels 294 and 296, respectively, on the adjacent walls 29. In order to obtain a condensed construction of the kaleidograph, the side walls 29 of the casing 28 are so spaced apart that they lie in close proximity to the circumference of a mounted drum C. In order to remove the frame 22 and the parts carried thereby from the casing 28, the latter will, after the removal of the cover 30 therefrom, be retracted from the frame 22 longitudinally of the latter, as previously described. However, in order to permit the retraction of the frame 22 from the casing 28, the baffle plates 290 and 292, being in their mounted position in the path of the mounted drum C (Fig. 4), will have to be removed first, as will be readily understood.

Projection lens G

Referring now to Figs. 1, 2 and 3, the projection lens G is mounted in any suitable holder 300, having a radially extending mounting post or stud 302. The post 302 of the lens holder 300 is received in a split clamp 304 (see also Fig. 7) which is pivotally connected by a pin 308 with one end of a link member 306. The other end of the link member 306 is pivotally connected by a screw 310 with the adjacent end of a similar link member 312 the other end of which is pivotally connected by a pin 314 with a split clamp 316. The clamp 316 is adjustably mounted on a bar 318 which is, in turn, mounted with its ends in projecting lugs 320 and 322 on the front wall 38 of the casing 28. The clamps 304, 316 and the link members 306, 312 constitute a universally adjustable mounting for the projection lens G. Special provisions are made to secure the parts 304, 316, 306 and 312 in any adjusted position of the projection lens G, on merely tightening the screw 310 which, for this purpose, is conveniently provided with a wing-shaped handle 326. These provisions assume the form of rockers 328 and 330 which are associated with the link members 306 and 312, respectively. The rockers 328 and 330 are, in the present instance, received in longitudinal grooves 332 and 334 in the link members 306 and 312, respectively, and their fulcrums are formed by the apexes 336 and 338 of their oppositely beveled bottom surfaces 340 and 342, respectively. As clearly shown in Fig. 7, the screw 310 and the pin 308 pass with slight clearance through apertures 346 and 348, respectively, in the opposite ends of the rocker 328, while the other pin 314 and the screw 310 extend with slight clearance through apertures 350 and 352, respectively, in the opposite ends of the rocker 330. The ends of the pins 308 and 314 are provided with stops 354 and 356, respectively, which may conveniently be in the form of rivet heads, so that the pin 308 forms an operating link between the clamp 304 and the rocker 328, and the pin 314 forms an operating link between the clamp 316 and the rocker 330. The threaded shank of the screw 310 receives a nut 358 which may have a rectangular projection 359 that fits into a similarly shaped recess 360 in the rocker 328 to prevent rotation of the nut 356 with the screw 310. It follows from Fig. 7 that the pins 308 and 314 will, on tightening of the screw 310, close the clamps 304 and 316, respectively, and force them into tight engagement with the adjacent links 306 and 312, respectively, while the screw 310 and nut 358 cooperate to cause tight engagement between the link members 306 and 312. On loosening the screw 310, the holder 300 with the projection lens G may be adjusted in any desired disposition relative to the mirror tube A, by relatively turning or rocking the parts 318, 316, 312, 306, 304 and 302, as will be readily understood.

In the performance of the kaleidograph, the motors 184 and 250 are operating, the former to drive the drum C at a relatively low speed, and the latter to drive the fan 240. Also, the bulb 198 is lighted for the projection onto a screen, or the like, of the ever-changing kaleidoscopic pattern which originates in the mirror tube A and is created by the pieces p in the revolving drum C. In order to have the projected kaleidoscopic pattern on a screen appear uniformly clear concentrically about the center of the projected pattern and clearest in the center of the latter, I have found that the projection lens G must be located with its center x on the axis c of the mirror tube A (Fig. 9), and the axis l of the projection lens G must extend through the far end e of the apex a of the angle between the mirrors 60 and 62 in the tube A. In thus adjusting the projection lens G, the kaleidoscopic pattern is projected to one side of the axis of the mirror tube A and, in view of the instant construction of the kaleidograph, also to one side of the median longitudinal plane through the latter. Also, in thus adjusting the projection links G, the projected kaleidoscopic pattern is, as above mentioned, uniformly clear concentrically about the center of the projected pattern and is, moreover, clearest at the center of the projected pattern and becomes gradually, though not very noticeably, fainter toward the outer circumference of the projected pattern.

Since the mirror tube A is angularly adjustable to cause a continuously changing projected kaleidoscopic pattern to converge toward, or diverge from, the center thereof in a continuous motion, and also to impart to the projected pattern a further motion to be described, if desired, the universal adjustability of the projection lens G readily permits its correct disposition relative to the mirror tube (Fig. 9) in any angular position of the latter. Thus, the parts 304, 306, 312 and 316 of the mounting for the projection lens G permit the adjustment of the latter in any position in any one of an infinite number of planes in which the axis of the bar 318 lies and which radiate from the latter, while the turnability of the lens post 322 in the clamp 304 permits the adjustment of the lens G in any position of inclination to the adjacent front wall 38 of the casing 28. The projection lens G is thus universally adjustable to accommodate any of an infinite number of angular positions of the mirror tube A. In view of the specific construction of the universal mounting of the projection lens G, the correct adjustment of the latter for any given angular position of the mirror tube A may be greatly facilitated by first adjusting the parts 304, 306, 312 and 316 so that the post 302 on the lens mounting 300 extends parallel, or substantially parallel, to the short side s of the mirror triangle T and the center x of the lens G coincides with the axis c of the mirror tube A (Fig. 2), and thereafter turning the lens holder 300 with its post 302 in the clamp 304 until the axis l of the lens G intersects the far end e of the apex of the angle formed by the mirrors 60 and 62 (Fig. 9). Fig. 8 shows a further example of the facile adjustment of the projection lens G. Thus, the post 302 of the lens holder 300 is first brought into parallelism, or substantial parallelism, with the short side s of the mirror triangle T and the lens G itself is brought with its center x into alignment with the axis c of the mirror tube A, whereupon the lens holder 300 is turned with its post 302 in the clamp 304 until the projected kaleidoscopic pattern is uniformly clear concentrically about the center thereof and clearest at the center of the projected pattern.

As previously alluded to, the angular position of the mirror tube A determines the kind of motion which the ever-changing kaleidoscopic pattern on a screen undergoes. Thus, in accordance with the kaleidoscope principle, the projected pattern diverges radially from the center thereof in a continuous motion when the pieces p in the drum C pass the mirror triangle T substantially parallel to its line of symmetry y in a direction toward the short side s thereof (Fig. 4). Conversely, the projected kaleidoscopic pattern converges radially toward the center thereof in a continuous motion when the pieces p in the drum C pass the mirror triangle T substantially parallel to its line of symmetry y toward the apex a of the mirror angle. Substantially no diverging or converging motion as above described will be imparted to a projected kaleidoscopic pattern if the mirror tube A is so adjusted that the mirror triangle T extends with its line of symmetry $y$ in a vertical plane $v$ (Fig. 4). Thus, outward divergence of a projected kaleidoscopic pattern from the center thereof in a continuous motion will be effected so long as the apex $a$ of the mirror angle is anywhere to the left of the plane $v$ as viewed in Fig. 4, while convergence of a projected kaleidoscopic pattern in a continuous motion toward the center thereof is effected so long as the apex $a$ of the mirror angle is to the right of the plane $v$ as also viewed in Fig. 4. Further, in accordance with the kaleidoscope principle, rotary motion in either direction about the center of a projected pattern is imparted to the latter in an infinite number of angular positions of the mirror tube A.

The provision of the sub-chambers 114' in the drum C, and the placement in these sub-chambers of masses of pieces $p$ which may differ more or less widely in the color and/or form combinations of the pieces of these masses, brings about unusually wide changes in the projected pattern during a single revolution of the drum C. Further, the ready removability of the drum C from the kaleidoscope permits ready interchange of drums C which may hold pattern-creating pieces $p$ of fundamentally different characteristics, respectively, thus rendering the instant kaleidograph well suited for the projection of kaleidoscopic patterns of widely different characteristics for various, and especially commercial, purposes. For instance, the instant drum C with its bits of colored glass may be replaced with another similar drum which may hold non-colored pieces so that the projected pattern obtained therefrom will be colorless to stress a mere form pattern.

While the light socket 196 and the motors 184 and 250 may be wired so as to be under the control of a single switch, the socket 196 and the fan motor 250 are preferably under the control of one manual switch (not shown), while the motor 184 is under the control of another manual switch (not shown), so as to permit the operator of the kaleidograph to stop rotation of the drum C and thereby hold any form of the projected kaleidoscopic pattern stationary on the projection screen or the like for studying or copying purposes.

Fig. 10 shows a modified drum C' which differs from the previously described drum C by being provided on its outer circumference with a cam lug 370 which is adapted to cooperate with a snap switch 372, for instance. The switch 372, which may normally be open, is closed by the cam lug 370 on the drum C', and may be in the circuit of the electric motor of a second conventional projector by means of which to cast advertising or other matter onto the same screen onto which the kaleidograph projects a kaleidoscopic pattern. In order that the projected matter from the second projector may not interfere with the projected pattern of the kaleidograph, the second projector will be operated while a sub-chamber 114'' of the drum C', which is devoid of any pattern-creating pieces $p$, passes the mirror tube A. To accomplish this, the cam lug 370 on the drum C' is accordingly coordinated with the empty sub-chamber 114''.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A kaleidograph, comprising a tube having two internal mirror surfaces extending longitudinally of the tube and forming an angle with each other, a light source at one end of said tube in illuminating relation with the interior of the latter, a drum located between said one tube end and light source and having opposite transparent end walls, said drum providing a chamber adapted to hold pattern-creating pieces and being of a width slightly larger than the average thickness of said pieces, means for supporting said drum for rotation about an axis coextensive with its own axis and substantially parallel to the tube axis so that the contained pieces are in image-reflecting relation with said mirror surfaces, a projection lens at the other end of said tube, and means for driving said drum.

2. A kaleidograph as set forth in claim 1, in which said drum is provided with a central hub, and said drum-supporting means comprise coaxially turnable members straddling said hub and being normally engageable in drum-supporting relation therewith, one of said members being axially movable relative to the other member for the removal of said drum from supporting relation with said members.

3. A kaleidograph as set forth in claim 1, in which said drum is provided with a central hub, said drum-supporting means comprise coaxially turnable friction disks straddling said hub and being normally engageable in drum-supporting relation therewith, one of said disks being axially movable relative to the other disk for the removal of said drum from supporting relation with said disks, and said drum-driving means comprise a drive for one of said disks.

4. In a kaleidograph having a transparent container adapted to hold pattern-creating pieces and being rotatable to change the relative position of the contained pieces, a light source at one side of said container, and a projection lens at the other side of said container, the combination of a tube extending axially between said container and lens so that said light source is in illuminating relation with the interior of said tube, two mirror elements extending longitudinally in said tube with their frontal reflector surfaces opposed and forming an angle with each other of which the apex is formed by two meeting side edges of said mirror elements, respectively, a wedge element interposed between the other side edges of said mirror elements, respectively, and set screws in said tube engaging said elements, respectively, for adjustably holding the latter in their relative disposition, said frontal mirror surfaces being in image-reflecting relation with the pieces in said container.

5. A kaleidograph, comprising a casing member having top, side and rear walls and a front wall provided with an aperture, a frame member in said casing member, a tube mounted on said frame member and having internal mirror surfaces forming an angle, said tube being in axial alignment with said aperture in the front wall of said casing member, a projection bulb mounted on said frame member at one end of said tube remote from said front wall of the casing member and in illuminating relation with the interior of said tube, a transparent container mounted on said frame member between said one tube end and projection bulb and adapted to hold pattern-creating pieces in image-reflecting relation with said mirror surfaces in said tube, a projection lens mounted on one of said members adjacent the other end of said tube, a ventilator located in said casing member and having an inlet near said projection bulb, an outlet to the outside of said casing member and a rotary impeller for drawing air through said inlet and expelling it through said outlet, and power means for driving said impeller.

6. A kaleidograph as set forth in claim 5, further comprising ventilation apertures in said side walls, respectively, of said casing member near the front wall thereof, so that said ventilator draws the admitted ventilation air in said casing member successively past said tube, container and projection bulb.

7. In a kaleidograph having a tube with two internal mirror surfaces forming an angle, a support in which said tube is turnable about its axis, a light source at one end of said tube in illuminating relation with the interior of the latter, a transparent container between said one tube end and light source adapted to hold pattern-creating pieces in image-reflecting relation with said mirror surfaces and being movable to change the relative position of the contained pieces, the combination of a projection lens at the other end of said tube, a holder for said lens having a depending post extending radially of the latter, and a mounting in which said lens holder is turnably supported with its post, said mounting comprising relatively adjustable parts to dispose said post in an infinite number of angular positions within a predetermined area in each of an infinite number of planes extending substantially at right angles to the tube axis.

8. The combination in a kaleidograph as set forth in claim 7, in which said mounting parts comprise a bar extending at right angles to the tube axis, a member turnable and longitudinally slidable on said bar and securable to the latter in any position thereon, another member in which said post of the lens holder is turnable and securable in any angular position, two links pivotally connected at their adjacent ends for relative rotation about an axis at right angles to said bar and pivoted at their other ends to said members, respectively, about axes at right angles to said bar, and means for releasably securing said members and links in any relative angular disposition.

9. The combination in a kaleidograph as set forth in claim 7, in which said mounting parts comprise a bar extending at right angles to the tube axis, a first clamp turnable and longitudinally slidable on said bar and closeable thereon in any position, a second clamp in which said post of the lens holder is turnable and which is closeable on said post in any angular position of the latter, two links, screw means pivotally connecting two adjacent ends of said links and clamping the latter against each other in any relative angular position on tightening said screw means, a headed pin longitudinally slidable in one of said clamps and the other end of one of said links and pivotally connecting them for relative rotation about an axis at right angles to said bar and parallel to said screw means, another headed pin longitudinally slidable in the other clamp and the other end of the other link and pivotally connecting them for relative rotation about an axis at right angles to said bar, and elements connecting said screw means with said pins, respectively, for sliding the latter to close said clamps, respectively, and clamp them to the adjacent links, respectively, in any angular relative disposition on tightening said screw means.

HENRY REGAN.

REFERENCES CITED

The following references are of record in the file of this patent:

UNITED STATES PATENTS

| Number | Name | Date |
|---|---|---|
| 1,449,122 | Marchand | Mar. 20, 1923 |
| 1,454,691 | Riddell et al. | May 8, 1923 |
| 1,505,151 | Kunschman | Aug. 19, 1924 |
| 1,595,627 | Seymour | Aug. 10, 1926 |
| 1,990,867 | Harvey | Feb. 12, 1935 |
| 2,329,112 | Eddy | Sept. 7, 1943 |
| 2,399,658 | Banker | May 7, 1946 |
| 2,423,371 | Carranza | July 1, 1947 |
| 2,475,930 | Wesley | July 12, 1949 |